United States Patent [19]

Stoddart

[11] 4,143,354
[45] Mar. 6, 1979

[54] DETECTION OF ERRORS IN DIGITAL SIGNALS

[75] Inventor: Alan G. Stoddart, Woodbridge, England

[73] Assignee: Post Office, London, England

[21] Appl. No.: 794,512

[22] Filed: May 6, 1977

[30] Foreign Application Priority Data

May 12, 1976 [GB] United Kingdom ............... 19544/76

[51] Int. Cl.$^2$ ...................... G06F 11/00; G08C 25/00
[52] U.S. Cl. .................... 340/146.1 E; 340/146.1 AQ
[58] Field of Search ............. 340/146.1 E, 146.1 AL, 340/146.1 AQ

[56] References Cited

U.S. PATENT DOCUMENTS

| 2,956,124 | 10/1960 | Hagelbarger | 340/146.1 AQ |
| 3,303,333 | 2/1967 | Massey | 340/146.1 AQ |
| 3,697,947 | 10/1972 | Macy | 340/146.1 AQ |
| 3,866,217 | 2/1975 | Bennett, Jr. | 340/146.1 E |
| 3,873,971 | 3/1975 | En | 340/146.1 AQ |
| 3,895,349 | 7/1975 | Robson | 340/146.1 E |
| 3,914,740 | 10/1975 | Han | 340/146.1 E |

OTHER PUBLICATIONS

E. R. Berlekamp, Algebraic Coding Theory, McGraw-Hill Book Co., 1968, pp. 331-336.

Primary Examiner—Charles E. Atkinson
Attorney, Agent, or Firm—Hall & Houghton

[57] ABSTRACT

A method of error detection in a digital system in which at least one digit in every n (where n is an integer greater than two) is omitted from use as the "particular digit" in the comparison of succeeding particular digits in a received pattern with the combination in accordance with a predetermined function of at least two digits preceding the particular digit in question by a particular spacing. The pattern is a pseudo-random binary sequence of maximal length and every third digit is taken as the particular digit. Every digit forms part of a comparison whether as "particular digit" or as one of said "at least two digits preceding". Shift registers, means to divide digits between the shift registers, and modulo -2 adders are used to carry out the method.

9 Claims, 4 Drawing Figures

DETECTION OF ERRORS IN DIGITAL SIGNALS

BACKGROUND OF THE INVENTION

1. Field of the Invention

This invention relates to error detection in a digital transmission system.

2. Description of the Prior Art

U.K. Patent specification No. 1,281,390 describes methods and apparatus for testing digital data transmission systems. A method of error detection described in this specification comprises receiving from a transmitter a serial pattern of digits in which each digit, as transmitted, is a predetermined function of two or more digits each preceding that digit by a particular spacing in the pattern, and comparing a digit in the received pattern with the combination, in accordance with the said predetermined function, of two or more digits preceding that digit by the said particular spacing in the received pattern and generating an error indication when there is no correlation. The comparison is made for each digit in turn of the serial pattern (remembering, of course, that the comparison cannot commence immediately at the very beginning of the pattern because at that time there are no preceding digits). If a particular bit is in error it will become in turn, as time progresses, the said "digit in the received pattern" then one of each of the "two or more digits preceding that digit by the said particular spacing". That is to say the erroneous digit will be involved in three or more comparisons and (ignoring correlated errors which the comparison cannot detect) three or more error indications will be given. For this reason, a divider circuit is connected to the output of the means generating the error indication.

Figure 1:
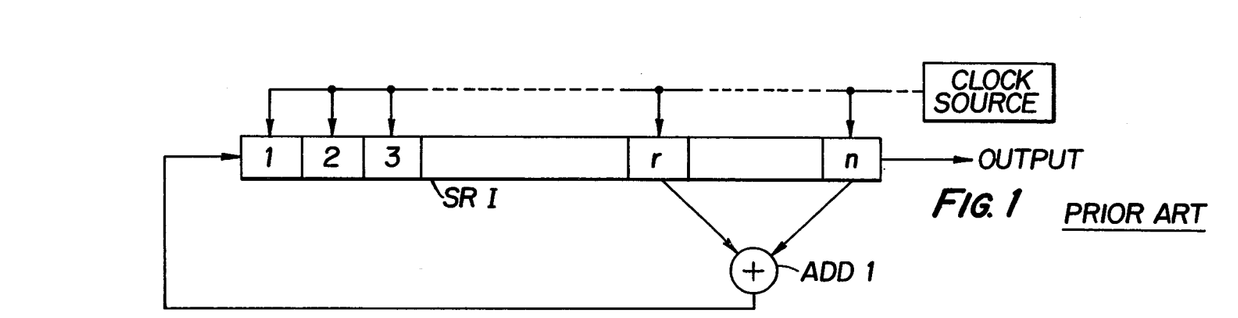
FIGS. 1 and 2 are diagrams which are described above.
Figure 2:
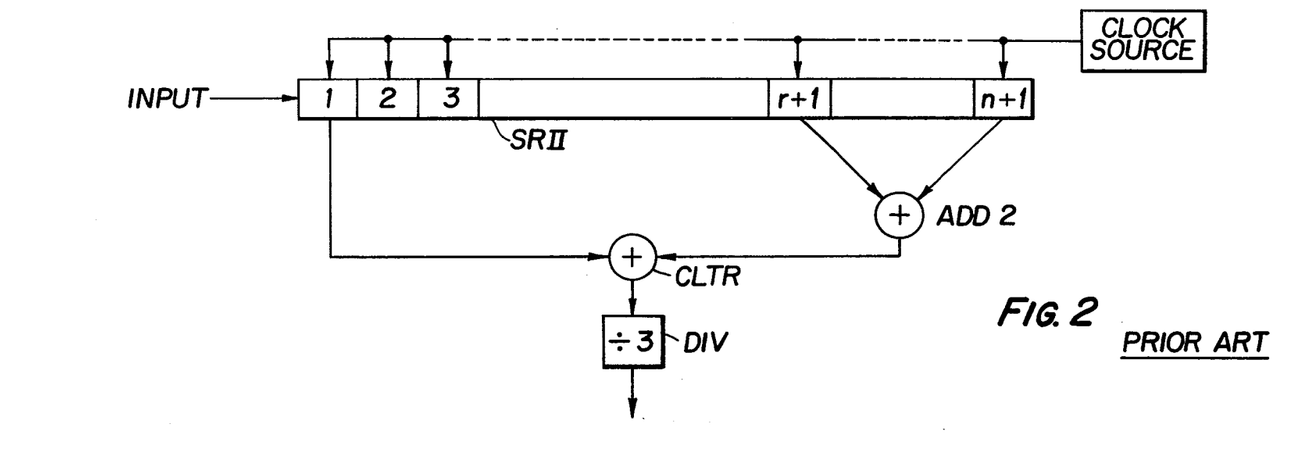

FIGS. 1 and 2 hereof reproduce the drawings appearing in U.K. Patent specification No. 1,281,390 and the following description is given in that specification:

FIG. 1 is a diagram of pseudo-random pattern generating apparatus forming part of the system, and FIG. 2 is a diagram of error detecting apparatus forming part of the system.

The drawings illustrate apparatus for detecting errors in a binary digital data transmission system. A pseudo-random pattern of binary data is generated in the apparatus illustrated in FIG. 1 and is passed from the transmitter to the receiver of the system that is being tested. Errors in the received pattern are detected in the apparatus illustrated in FIG. 2, thereby enabling the probability of bit error in the transmission system to be measured.

The pseudo-random pattern generator (FIG. 1) is of conventional form and includes a shift register SRI having n stages SR1, SR2, ... SRr, ... SRn. The rth and nth stages of the register SRI have outputs to a modulo 2 adder ADD1 the output of which is connected back to the input of the register. The output of the register is transmitted over the system that is being tested.

When a suitable train of bits is stored in the shift register SRI the apparatus functions to generate a pseudo-random pattern of bits in which, under conditions of no error, any bit is correlated with the modulo 2 sum of the rth and nth preceding bits. The function of the register SRI is illustrated, by way of example, for the case n = 4 in the Table I set out below. In this Table it is assumed that the third and fourth stages of the register are connected to the input of the modulo 2 adder ADD1 and that, initially, the digits stored in the stages SR1-SR4 of the register are 1, 0, 0, 1 respectively as shown in Table I. The bits "0" and "1" stored in stages SR3 and SR4 of the register are combined in the adder ADD1 to yield a bit "1" which is fed to the shift register input.

The register is advanced by pulses from a clock source and, on receipt of the first advance pulse the bits stored in register stages SR1, SR2 and SR3 are fed to stages SR2, SR3 and SR4 respectively, and the bit "1" from the modulo 2 adder is fed to register stage SR1. Bits "0" and "0" which are now stored in register stages SR3 and SR4 are combined in the adder ADD1 to yield a bit "0" which is fed to the register input. Upon receipt of the next advance pulse the process is repeated, and it will be seen that in the resultant output pattern (once the pattern is established) each bit is the modulo 2 sum of the third and fourth preceding bits, unless an error has been introduced.

Table I

| Shift Register SRI | | | | ADDI | Shift Register |
|---|---|---|---|---|---|
| SR1 | SR2 | SR3 | SR4 | Output | (SR1) Output |
| 1 | 0 | 0 | 1 | 1 | 1 |
| 1 | 1 | 0 | 0 | 0 | 0 |
| 0 | 1 | 1 | 0 | 1 | 0 |
| 1 | 0 | 1 | 1 | 0 | 1 |
| 0 | 1 | 0 | 1 | 1 | 1 |
| 1 | 0 | 1 | 0 | 1 | 0 |
| 1 | 1 | 0 | 1 | 1 | 1 |
| 1 | 1 | 1 | 0 | 1 | 0 |
| 1 | 1 | 1 | 1 | 0 | 1 |
| 0 | 1 | 1 | 1 | 0 | 1 |
| 0 | 0 | 1 | 1 | 0 | 1 |
| 0 | 0 | 0 | 1 | 1 | 1 |
| 1 | 0 | 0 | 0 | 0 | 0 |
| 0 | 1 | 0 | 0 | 0 | 0 |
| 0 | 0 | 1 | 0 | 1 | 0 |
| 1 | 0 | 0 | 1 | 1 | 1 |
| | | | | | etc. |

The use of a four stage shift register has been described by way of example only and it will be appreciated that registers having other numbers of stages could be employed and also that the inputs to the adder ADD1 need not be from adjacent register stages.

The error detecting apparatus (FIG. 2) also includes a shift register SRII, but this register has, for a purpose which will be explained below, (n + 1) stages: SR1, SR2 ... SRr, SR(r + 1) ... SRn, SR(n + 1). The (r + 1)th and the (n + 1)th stages have outputs to a modulo 2 adder ADD2 the output of which is applied, together with the output of the first stage of the register, to a correlator CLTR (for example, a further modulo 2 adder). The correlator compares the inputs and generates an output signal when the inputs are not the same.

The pseudo-random pattern from the apparatus of FIG. 1 is fed (in the form in which it is received at the receiver of the transmission system) to the shift register SRII. Under conditions of no error, the modulo 2 sum of the digits which at any one time are stored in stage SR(r + 1) and SR(n + 1) of register SRII should correlate with the digit stored in the first stage of the register, since this was the manner in which the pattern was generated in the apparatus of FIG. 1. If there is no correlation an error is present, and an output signal is generated by the correlator CLTR.

The use of n + 1 stages in the shift register SRII is not essential: a register have n stages could be used, with the adder ADD2 receiving the output of the rth and nth stages (instead of the (r + 1)th and (n + 1)th stages) and with the input to the register (instead of the output of the first stage) being applied to the correlator CLTR. In such an arrangement, however, it is advisable to include a buffer stage between the input to the register SRII and the correlator CLTR to ensure that no distorted pulses are fed to the correlator. When a register SII having (n + 1) stages is used, the first stage of the register itself acts as a buffer stage to ensure that undistorted, correctly clocked signals are fed to the correlator.

The particular arrangement of error detecting gates (that is, modulo 2 adder ADD2 and correlator CLTR) shown in FIG. 2 is not the only arrangement that could be utilized to detect errors in a digital pattern generated in the apparatus of FIG. 1. Other gating arrangements having the same functional effect as the gates ADD2 and CLTR (that is, the comparison of the output of the first stage of the shift register SRII with the modulo 2 sum of the outputs of the (r + 1)th and (n + 1)th stages) could be employed.

The function of the error-detecting apparatus shown in FIG. 2 is illustrated, by way of example, in Tables II and III set out below. In this case, it is assumed that the apparatus is to be employed with pattern generating apparatus as described above with reference to Table I. Accordingly since n = 4, the shift register SRII has 5 stages, the fourth and fifth stages having outputs to the modulo 2 adder ADD2. It is also assumed that the shift register SRI generates the output pattern specified in Table I.

Table II

| Shift Register SRII Input | SR1 | SR2 | SR3 | SR4 | SR5 | ADD2 Output |
|---|---|---|---|---|---|---|
| 0 | 1 | 1 | 0 | 0 | 1 | 1 |
| 1 | 0 | 1 | 1 | 0 | 0 | 0 |
| 0 | 1 | 0 | 1 | 1 | 0 | 1 |
| 1 | 0 | 1 | 0 | 1 | 1 | 0 |
| 1 | 1 | 0 | 1 | 0 | 1 | 1 |
| 1 | 1 | 1 | 0 | 1 | 0 | 1 |
| 1 | 1 | 1 | 1 | 0 | 1 | 1 |
| 0 | 1 | 1 | 1 | 1 | 0 | 1 |
| 0 | 0 | 1 | 1 | 1 | 1 | 0 |
| 0 | 0 | 0 | 1 | 1 | 1 | 0 |
| 1 | 0 | 0 | 0 | 1 | 1 | 0 |
| 0 | 1 | 0 | 0 | 0 | 1 | 1 |
| 0 | 0 | 1 | 0 | 0 | 0 | 0 |
| 1 | 0 | 0 | 1 | 0 | 0 | 0 |
| 1 | 1 | 0 | 0 | 1 | 0 | 1 etc. |

Table II illustrates the function of the error detecting apparatus in the absence of bit error. When the first bit from the output of shift register SRI, which is a "1" reaches the fifth stage of register SRII, the following "0" is in the fourth stage so that the output of the modulo 2 adder is a bit "1". This is compared by the correlator CLTR with the bit stored in the first stage of register SRII, which as shown in Table II is in the absence of errors, also a "1". The correlator, accordingly, does not generate an error signal.

The register SRII is advanced by pulses from a clock source and, on receipt of the next advance pulse, the bits stored in stages SR1 to SR4 of register SRII are fed to stages SR2 to SR5 and the next bit in the pattern generated by the FIG. 1 apparatus is fed to stage SR1. As shown in Table II, there is now a "0" in each of stages SR4 and SR5 so that the adder ADD2 yields the bit "0". The bit stored in stage SR1 of the register is now also a "0" so that the correlator CLTR again produces no output.

Table III

| Shift Register SRII Input | SR1 | SR2 | SR3 | SR4 | SR5 | Add 2 Output |
|---|---|---|---|---|---|---|
| 0 | 1 | 1 | 0 | 0 | 1 | 1 |
| 0($c_1$) | 0 | 1 | 1 | 0 | 0 | 0 |
| 0 | 0($c_1$) | 0 | 1 | 1 | 0 | 1 Error |
| 1 | 0 | 0($c_1$) | 0 | 1 | 1 | 0 |
| 1 | 1 | 0 | 0($c_1$) | 0 | 1 | 1 |
| 1 | 1 | 1 | 0 | 0($c_1$) | 0 | 0 Error |
| 0($c_2$) | 1 | 1 | 1 | 0 | 0($c_1$) | 0 Error |
| 0 | 0($c_2$) | 1 | 1 | 1 | 0 | 1 Error |
| 0 | 0 | 0($c_2$) | 1 | 1 | 1 | 0 |
| 0 | 0 | 0 | 0($c_2$) | 1 | 1 | 0 |
| 1 | 0 | 0 | 0 | 0($c_2$) | 1 | 1 Error |
| 0 | 1 | 0 | 0 | 0 | 0($c_2$) | 0 Error |
| 0 | 0 | 1 | 0 | 0 | 0 | 0 |
| 1 | 0 | 0 | 1 | 0 | 0 | 0 |
| 1 | 1 | 0 | 0 | 1 | 0 | 1 etc. |

Table III indicates the function of the error detector when two bits in the data pattern are received incorrectly as "0" instead of "1". The errors are indicated in Table III by the symbols ($c_1$) and ($c_2$). When the first error ($c_1$) reaches the stage SR1 of the register, there is a bit "1" stored in the stage SR4 and a bit "0" stored in the stage SR5 so that the output of adder ADD2 is a bit "1". At this time the error bit "0" is stored in stage SR1 of the register so that there is no correlation between the inputs to the correlator CLTR which therefore produces an error signal.

It can be seen from a consideration of Table III that, provided the errors are so widely spaced that there is only one bit error in the register SRII at a time, each error will cause the correlator to generate three error signals (resulting from the passage of the error through stages SR1, SR4 and SR5 of the register). In view of this, the error detector includes, in addition to the correlator CLTR, a divide by three circuit DIV which generates an output signal in response to every three error signals generated by the correlator. The output of the divide circuit DIV is fed to a counter (not shown) to obtain a measurement of the bit error rate in the transmission system. Alternatively, the production of three error signals by a single error could be eliminated by including a modulo 2 adder between stages SR1 and SR2 in the shift register SRII and applying the output of the correlator CLTR to this adder together with the received pattern from the shift register stage SR1. The generation of an error signal by the correlator CLTR will then result in correction of the erroneous input digit to the shift register stage SR2 with the result that no further error signals will be caused by that digit.

It can be shown, if the bit errors in the pattern received by the FIG. 2 apparatus are assumed to be statically independent, that the bit error rate as measured at the output of the divide circuit DIV (that is, the mean error rate approximates very closely to the actual rate when the probability of bit error is low: for example, the measurement accuracy is about 98% for a bit error probability of 0.01, dropping to about 60% for a bit error probability of 0.25. These measurement accuracies are comparable (except at very high error rates) with those that can be achieved with conventional error detector involving the local generation (at the receiver) of a test pattern and comparison of the test and received patterns. However, conventional detectors involve complex equipment to synchronize the test and received patterns and may lose synchronization at high error rates whereas apparatus of the type shown in FIG.

2 provides a continuously synchronized error detector which is not affected by error rate.

If bit errors occur in blocks, instead of singly as assumed in Table III, then the measurement accuracy may be reduced. This is illustrated in Table IV which is similar to Table II and III but includes a block of three bit errors ($c_1$), ($c_2$) and ($c_3$).

Table IV

| Shift Register (SRRII) Input | Shift Register (SRII) | | | | | ADD2 Output |
|---|---|---|---|---|---|---|
| | SR1 | SR2 | SR3 | SR4 | SR5 | |
| 1($c_1$) | 1 | 1 | 0 | 0 | 1 | 1 |
| 0($c_2$) | 1($c_1$) | 1 | 1 | 0 | 0 | 0 Error |
| 1($c_3$) | 0($c_2$) | 1($c_1$) | 1 | 1 | 0 | 1 Error |
| 1 | 1($c_3$) | 0($c_2$) | 1($c_1$) | 1 | 1 | 0 Error |
| 1 | 1 | 1($c_3$) | 0($c_2$) | 1($c_1$) | 1 | 0 Error |
| 1 | 1 | 1 | 1($c_3$) | 0($c_2$) | 1($c_1$) | 1 |
| 1 | 1 | 1 | 1 | 1($c_3$) | 0($c_2$) | 1 |
| 0 | 1 | 1 | 1 | 1 | 1($c_3$) | 0 Error |
| 0 | 0 | 1 | 1 | 1 | 1 | 0 |
| 0 | 0 | 0 | 1 | 1 | 1 | 0 |
| 1 | 0 | 0 | 0 | 1 | 1 | 0 |
| 0 | 1 | 0 | 0 | 0 | 1 | 1 |
| 0 | 0 | 1 | 0 | 0 | 0 | 0 |
| 1 | 0 | 0 | 1 | 0 | 0 | 0 |
| 1 | 1 | 0 | 0 | 1 | 0 | 1 |

Since the presence of one error sometimes cancels out the presence of another, only five error signals are generated by the correlator CLTR whereas nine signals would have been generated if the errors had passed through the register SRII singly. A similar effect may occur if the spacing between bit errors is, for example, (referring to FIGS. 1 and 2) r or n or n-r.

It has been found that blocks of statistically-independent errors do not have a significant effect on the accuracy of the long-term mean error rate as measured at the output of the divide circuit DIV (FIG. 2), but if it is wished to measure the block errors themselves then measurement accuracy can be increased (as least as regards bit errors occurring in blocks of two) by spacing the rth and nth stages of the registers SRI, SRII apart by at least one stage. As the spacing between the rth and nth stages, and also the value of r is increased further, so the apparatus becomes more alert to longer blocks of bit errors.

A further advantage of spacing the rth and nth stages of registers SRI, SRII apart by at least one stage is that errors occurring in coherent pairs can be detected. Coherent pairs of errors are errors which occur simultaneously in adjacent bits of a digital stream and are not statistically independent. Such errors can arise when the digital stream is transmitted by modulation onto a carrier, depending on the method of modulation/demodulation that is used. One method which can give rise to coherent pairs of errors is phase coherent modulation/demodulation with differential coding/decoding: in this system, the phase of any one bit is compared with the phase of the previous bit with the result that a single error in the coded pulse stream causes simultaneous errors in adjacent bits of the decoded pulse stream. It has been found that apparatus as shown in FIGS. 1 and 2 (with n—r)>)1 can detect these coherent pairs of errors with similar accuracy to that associated with the detection of single errors, and as the spacing (n—r) is increased so the apparatus becomes more alert to errors in larger coherent blocks.

It will be appreciated from the above description that the form of the error detecting apparatus is dependent upon the form of the pseudo-random pattern transmitted over the system, and that the arrangement shown in FIG. 1 could be replaced by other pseudo-random pattern generators with appropriate modifications being made to the detector of FIG. 2. The general arrangement shown in the drawing is, however, preferable on the ground of simplicity, particularly advantageous arrangements (as regards the detection of block errors) being those in which the pattern generator (FIG. 1) has 9 stages with a modulo 2 feed back from stages 5 and 9 (i.e. n = 9, r = 5) and 18 stages with a modulo 2 feed back from stages 11 and 18 (i.e., n = 18, r = 11).

SUMMARY OF THE INVENTION

According to the present invention a method of error detection in a digital system comprising receiving from a transmitter a serial pattern of digits in which each digit, as transmitted, is a predetermined function of two or more digits each preceding that digit by a particular spacing in the pattern, comparing a particular digit in the received pattern with the combination, in accordance with the said predetermined function, of two or more digits preceding that digit by the said particular spacing in the received pattern and generating an error indication when there is no correlation, and repeating the comparison for succeeding particular digits in the received pattern is characterised in that one or more digits in every n (where n is an integer greater than two) are omitted for use as the particular digit.

Where a particular digit is compared with j digits each preceding that digit by a particular spacing (where j is an integer equal to or greater than two), n can equal j + 1 and j digits in every n can be omitted for use as the particular digit. For example, where a particular digit is compared with two preceding digits, every third digit in the received pattern can be taken in turn as the particular digit. This obviates the need to divide the detected errors by three.

It can be arranged that even though one or more digits in every n are omitted for use as the particular digit, nevertheless every digit in the received pattern is compared by being either at some instant the "particular digit" or one of the "two or more digits preceding that digit by the said particular spacing".

The received pattern can be a pseudo-random binary sequence of maximal length.

The invention also provides an error detection circuit operative to detect errors in a received serial pattern of digits in which each digit, as transmitted, is a predetermined function of two or more digits each preceding that digit by a particular spacing in the pattern, the circuit comprising means to compare a particular digit in the received pattern with the combination, in accordance with the said predetermined function, of two or more digits preceding that digit by the said particular spacing and to generate an error indication when there is no correlation, and means to select particular digits from the received pattern for the comparison and operative to omit one or more digits in every n (where n is an integer greater than two) for use as the said particular digit.

The means to select particular digits can comprise a plurality of shift registers and means to divide the digits of the received pattern between the registers.

The means to compare a particular digit with the combination of two or more preceding digits can comprise one or more modulo-2 adders.

Each modulo-2 adder can have but a single connection to any particular shift register of the plurality.

DESCRIPTION OF PROPOSED EMBODIMENTS

Figure 3:
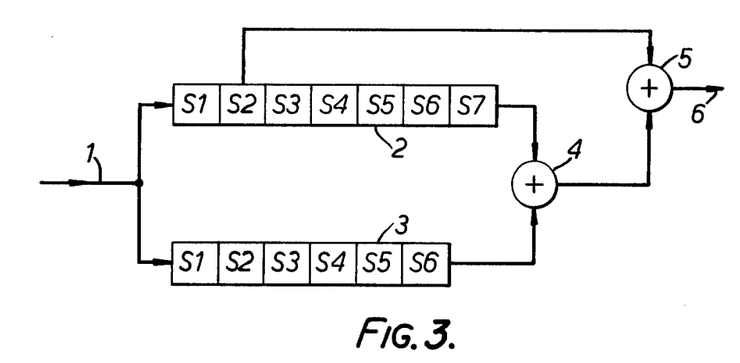
FIGS. 3-6 are comparable diagrams illustrative of the present invention.
Figure 4:
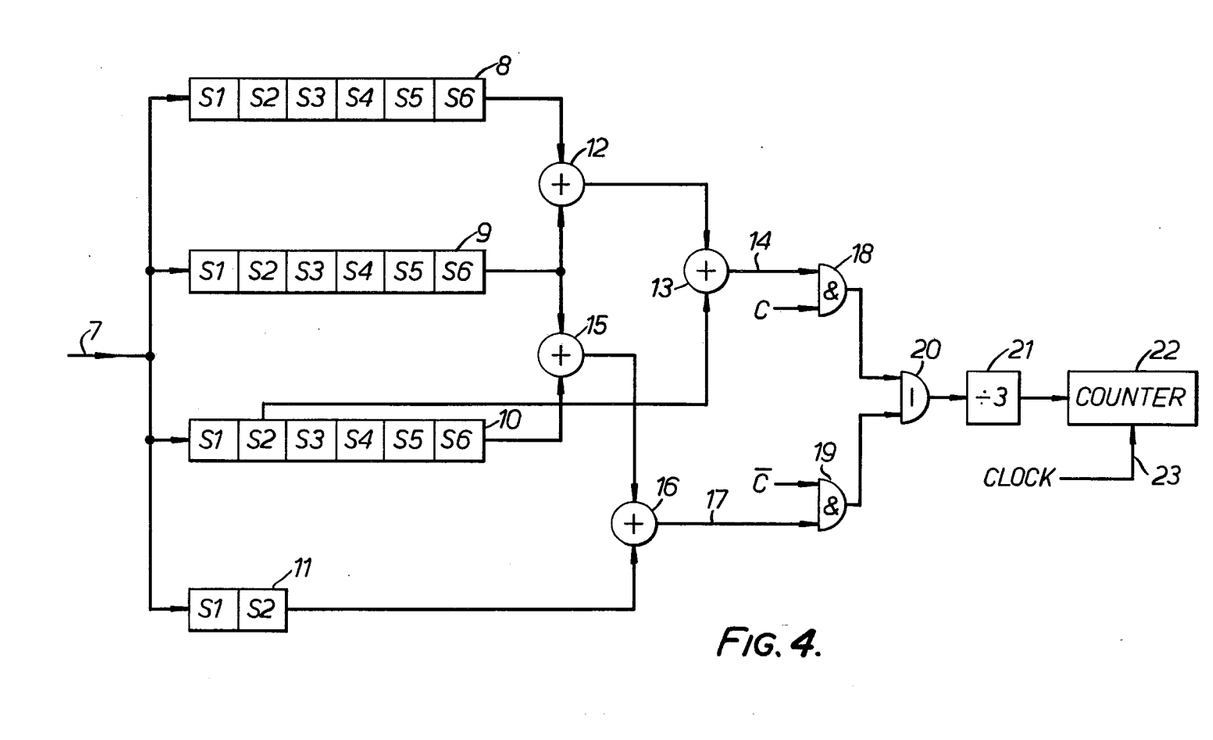
Figure 5:
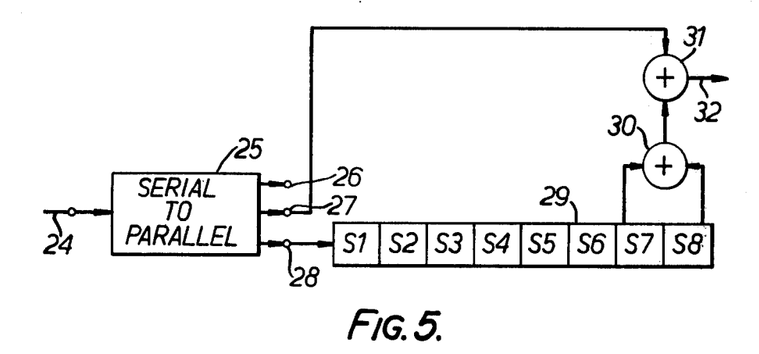
Figure 6:
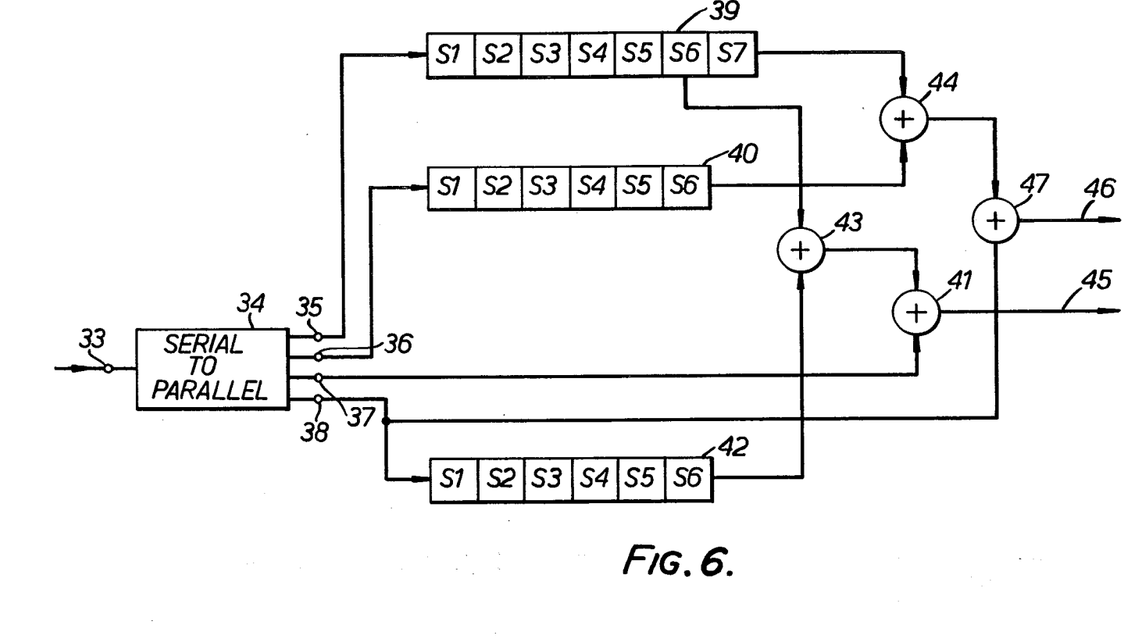

By way of example only, certain illustrative embodiments of the invention will now be described with reference to FIGS. 3-6 of the accompanying drawings, in which:

FIGS. 1 and 2 reproduce FIGS. 1 and 2 of prior art U.K. specification no. 1,281,390, FIG. 3 shows an error detector for a pseudo-random binary sequence of length $2^{15}$-1 bits, FIG. 4 shows another error detector for a pseudo-random binary sequence of length $2^{15}$-1 bits, FIG. 5 shows an error detector for a pseudo-random binary sequence of length $2^{25}$-1 bits, and FIG. 6 shows another error detector for a pseudo-random binary sequence of length $2^{25}$-1 bits.

If the reader does not already have a knowledge of the way in which a digital data transmission system can be tested by means of a pseudo-random binary sequence, he should first of all study the content of specification 1,281,390 reproduced above. The present embodiments are all error detectors of the same general type as the error detector of FIG. 2.

The invention of that earlier case provides error detection without frame synchronisation. It does this by regenerating a test signal at a receiver and comparing the regenerated signal with the form of the test signal received at the receiver. In fact, the test signal is formed as a serial pattern of digits in which each digit is a predetermined function of two or more digits each preceding that digit by a particular spacing in the pattern, and the error detector compares the received pattern with the combination (in accordance with the said predetermined function, of the corresponding digits in the received pattern. By the present invention this is achieved by the employment of parallel shift registers arranged, on the assumption that errors will be distributed more or less randomly between the individual registers, to indicate a true count of the number of errors present without the need for the extra circuitry which would otherwise be required to allow for an excess error count resulting from the multiple appearance of erroneous digits when the test signal is regenerated.

A maximal length pseudo-random sequence of length $2^{15}$-1 bits is defined by the relationship that the nth bit is the modulo-2 sum of the bits preceding that bit by fourteen and fifteen places, that is:

$$B_n = B_{n-14} \oplus B_{n-15}$$

where $B_n$ is the nth bit, $B_{n-14}$ the (n-14)th bit and $B_{n-15}$ is the (n-15)th bit in a sequence of bits $B_1$, $B_2$, $B_3$, $B_4$ . . . etc. The sign $\oplus$ indicates modulo-2 addition.

The error detector shown in FIG. 2 performs a modulo-2 check sum for each bit in turn of the received sequence. In contrast the embodiment shown in FIG. 3 performs a modulo-2 check sum on every third bit in a received sequence.

Referring to FIG. 3, an incoming pseudo-random binary sequence is received on a line 1 connected commonly to the input of a seven-stage shift register 2 and a six-stage shift register 3. The stages of the registers are referenced S1, S2, S3 . . . etc. commencing from the input end. The stages S1 of the two registers are clocked (the clocking arrangements are not shown) so that, considering the incoming bits in groups of three, every first bit enters S1 of register 2 and every third bit enters S1 of register 3. The second bit of each group is not used. The stages S2 of the two registers are appropriately clocked so as to act as a buffer between the stages S1 and the remaining stages of the registers. The stages S3 and upwards of the two registers are shifted simultaneously and steadily at one third the bit-rate of the incoming sequence. If the content of stage S2 of register 2 at any given time is $B_n$, then the content of stage S6 of register 3 is $B_{n-14}$ and the content of stage S7 of register 2 is $B_{n-15}$. A modulo-2 adder 4 is connected to the output of S6 of register 3 and S7 of register 2 to form the sum $B_{n-14} \oplus B_{n-15}$. A further modulo-2 adder 5 connected to adder 4 and stage S2 compares $B_{n-14} \oplus B_{n-15}$ with the output of S2 of register 2, that is it checks the equality $B_n = B_{n-14} \oplus B_{n-15}$. If the equality is not satisfied the adder 5 produces an error-indicating output on line 6.

On the assumption that errors occur randomly, a count of the number of times an output occurs on line 6 is equal to the number of errors in the incoming sequence. There is no need to connect a divider circuit to the output of adder 5. On average three received error bits will produce three error-indicating outputs.

Referring to FIG. 4, an incoming pseudo-random binary sequence is received on a line 7 connected commonly to the input of a six-stage shift register 8, another six-stage shift register 9, another six-stage shift register 10, and a two-stage shift register 11. The stages are referenced as in FIG. 3. The stages S1 of the two registers are clocked (the clocking arrangements are not shown) so that, considering the incoming bits in groups of four, every first bit enters S1 of register 8, every second bit enters S1 of register 9, every third bit enters S1 of register 10, and every fourth bit enters S1 of register 11. The stages S2 of the registers are used as buffers. Stages S3 to S6 of registers 8, 9, 10 are shifted simultaneously and steadily at one quarter the bit-rate of the incoming sequence. If the content of stage S2 of register 10 at any given time is $B_n$, then the content of stage S6 of register 8 is $B_{n-14}$ and the content of stage 6 of register 9 is $B_{n-15}$. A modulo-2 adder 12 is connected to the output of S6 of register 8 and S6 of register 9 to form the sum $B_{n-14} \oplus B_{n-15}$. A further modulo-2 adder 13 is connected to adder 12 and stage S2 of register 10 to compare $B_{n-14} \oplus B_{n-15}$ with the output of S2 of register 10, that is it checks the equality $B_n = B_{n-14} \oplus B_{n-15}$. If the equality is not satisfied the adder 13 produces an error-indicating output on line 14.

If the content of stage S2 of register 10 is $B_n$, then the content of stage S2 of register 11 is $B_{n-1}$ and the content of stage S6 of register 10 is $B_{n-16}$. A further modulo-2 adder 15 is connected to the output of S6 of register 9 and S6 of register 10 to form the sum $B_{n-15} \oplus B_{n-16}$. A further modulo-2 adder 16 compares $B_{n-15} \oplus B_{n-16}$ with the output of S2 of register 11, that is it checks the equality $B_{n-1} = B_{n-15} \oplus B_{n-16}$. If the equality is not satisfied the adder 16 produces an error-indicating output on line 17.

It should be noted that every bit in the incoming sequence is tested by the error detector of FIG. 4. If a single bit is in error and that bit is in register 8, adder 12 will detect the error. If that bit is in register 9, the error will be detected twice, once by adder 12 and once by adder 15. If that bit is in register 10, the error will be detected twice, once when the bit is at stage S2 and once again when the bit is in stage S6. If that bit is in register 11, adder 16 will detect the error.

Thus, if there are four unrelated single errors one in each of the four registers 8, 9, 10, 11, the outputs on lines 14 and 17 will, together, indicate six errors. To obtain a true count the total count from adders 13 and 16 needs to be multiplied by $\frac{2}{3}$.

A two-input AND gate 18 has one of its inputs connected to line 14 and the other to a clock signal c. Another two-input AND gate 19 has one of its inputs connected line 17 and the other to a clock signal c̄ (the inverse of c). The clock signal c is a square-wave of one quarter the bit-rate of the incoming sequence.

An OR gate 20 has its inputs connected to the outputs of AND gates 18 and 19 and its output connected to a divide-by-three circuit 21. The output of the divide-by-three circuit 21 is connected to control a counter 22. The counter, when enabled by the output of the divide-by-three circuit 21, counts clock pulses on a line 23. The frequency of the clock pulses on line 23 is such that, together with the $\frac{1}{3}$ division factor, the desired multiplication factor of $\frac{2}{3}$ is achieved so that a count of the true number of errors is achieved.

Referring to FIG. 5, an error detector for a $2^{25}-1$ pseudo-random binary sequence is illustrated. A $2^{25}-1$ sequence is defined by the relationship $B_n = B_{n-22} \oplus B_{n-25}$.

An incoming sequence is received on a line 24 and applied to a serial to parallel converter 25. Considering the incoming bits in groups of three, the converter routes every first bit to terminal 26, every second bit to terminal 27, and every third bit 28 (its function is thus the same as the first two stages of the registers in FIGS. 3 and 4 and indeed it can be made in that form).

The output from terminal 28 is applied to the input of an eight-stage shift register 29. The stages are referenced S1, S2, S3 etc. starting at the input end and are shifted simultaneously and steadily at one-third the bit-rate of the incoming sequence. If the bit at terminal 27 is $B_n$, then the content of stage S7 is $B_{n-22}$ and the content of stage S8 is $B_{n-25}$. A modulo-2 adder 30 is connected to the outputs of S7 and S8 to form $B_{n-22} \oplus B_{n-25}$ and a further modulo-2 adder 31 checks the equality $B_n = B_{n-22} \oplus B_{n-25}$ and produces an output on line 32.

FIG. 5 it will easily be seen in FIG. 3 modified to provide a $2^{25}-1$ sequence error detector instead of a $2^{15}-1$ sequence error detector.

FIG. 6 likewise corresponds to FIG. 4 but detects errors in a $2^{25}-1$ sequence instead of a $2^{15}-1$ sequence. In FIG. 6, an incoming sequence is received on line 33 and applied to a serial to parallel converter 34 equivalent to the stages S1, S2 of the registers of FIG. 4. The converter 34 has four output terminals 35, 36, 37, 38 connected respectively to the input of a seven-stage shift register 39, the input of a six-stage shift register 40, one input of a modulo-2 adder 41, and the input of another six-stage shift register 42. The registers are shifted simultaneously and steadily at one quarter the incoming bit rate.

If the bit at terminal 37 is $B_n$, then the content of stage S6 of register 39 is $B_{n-22}$ and the content of stage S6 of register 42 is $B_{n-25}$. A modulo-2 adder 43 is connected to form the sum $B_{n-22} \oplus B_{n-25}$ and the modulo-2 adder 41 is connected to check the equality $B_n = B_{n-22} \oplus B_{n-25}$ and produces an output on line 45.

If the bit at terminal 37 is $B_n$, then the bit at terminal 38 is $B_{n-1}$, the content of S7 of register 39 is $B_{n-26}$, and the content of S6 of register 40 is $B_{n-23}$.

A modulo-2 adder 44 is connected to form the sum $B_{n-23} \oplus B_{n-26}$ and another modulo-2 adder 47 is connected to check the equality $B_{n-1} = B_{n-23} \oplus B_{n-26}$ and produces an output on line 46.

The output lines are connected to circuitry (not shown) corresponding to the elements 18 to 22 of FIG. 4.

It will be noted that in all the embodiments the registers are shifted more slowly than the incoming bit-rate thus enabling logic elements of a given speed to operate with a higher incoming bit-rate than would otherwise be possible.

The fact that not every digit in the received sequence is used as $B_n$ in a check sum of the form $B_n = B_{n-1} \oplus B_{n-m} \oplus \ldots$ etc. provides a simplification of the circuitry required and in some case obviates the need for error count division.

Error detectors responsive to other sequences besides those specifically mentioned can be constructed.

Some forms of equipment to be tested may not require the serial to parallel conversion shown in the embodiments. For example, equipment working with four synchronous binary tributaries could be connected directly to the registers and adders of FIGS. 5 and 6.

Specific timing arrangements for the serial to parallel converters have not been discussed since ways of achieving conversion with a suitably buffered output are known to those skilled in the art. Two very brief examples will, however, now be given, the first in relation to FIG. 3. Let $C_o$ be a clock waveform at one third the bit-rate of the incoming sequence and let $C_{240}$ be $C_o$ phase-shifted by 240°, then stage 1 of register 1 can be clocked by $C_{240}$, stage 1 of register 2 can be clocked by $C_o$, and all the remaining stages by $C_{240} + \Delta$ (where $\Delta$ is a small delay to allow for delay in the stages S2). As a second example in relation to FIG. 4, let $C'_o$ be a clock waveform at one quarter the bit-rate of the incoming sequence, then the clocking arrangements are S1 (register 8)-$C'_{270}$; S1 (register 9)-$C'_{180}$; S1 (register 10)-$C'_{90}$; S1 (register 11)-$C'_o$; all remaining stages $C'_{270} + \Delta$ (the notation $C'_{180}$, for example, meaning $C'_o$ shifted by 180°).

It is to be understood that the described circuits can be modified, for example, the shift registers can be of delay-line type.

What is claimed is:

1. A method of error detection in a digital system comprising the steps of:
   receiving from a transmitter a serial pattern of digits in which each digit, as transmitted, is a predetermined function of at least two digits each preceding that digit by a particular spacing in the pattern,
   comparing a particular digit in the received pattern with the combination, in accordance with the said predetermined function, of at least two digits preceding that digit by the said particular spacing in the received pattern, and generating an error indication in the absence of correlation, and
   repeating the comparison for succeeding particular digits in the received pattern, wherein the improvement comprises the step of:
   omitting at least one digit in every n (where n is an integer greater than two) for use as the particular digit.

2. A method as set forth in claim 1, in which said comparing step comprises comparing a particular digit with j digits each preceding that digit by a particular spacing (where j is an integer at least equal to two), wherein n equals j + 1 and said omitting step comprises omitting j digits in every n for use as the particular digit.

3. A method as set forth in claim 2, wherein j is two and said repeating step comprises taking every third digit in the received pattern as the said particular digit.

4. A method as set forth in claim 1, wherein in said comparing and repeating steps every digit in the received pattern is compared by having at some instant one identity selected from the group consisting of the said "particular digit" and one of the said "at least two digits preceding that digit by the said particular spacing".

5. A method as set forth in claim 1, wherein said received pattern is a pseudo-random binary sequence of maximal length.

6. An error detection circuit comprising:
 input means arranged to receive a serial pattern of digits in which each digit, as transmitted, is a predetermined function of at least two digits each preceding that digit by a particular spacing in the pattern,
 digit-combining means connected to said input means to combine at least two digits in accordance with said predetermined function,
 comparison means connected to said input means and said digit-combining means to compare a particular digit in the received pattern with the combination at the output of said digit-combining means of said at least two digits preceding that digit by the said particular spacing,
 error-indication output means connected to the output of said comparison means arranged to transmit an error indication in the absence of correlation between the inputs of the comparison means, and wherein the improvement comprises the provision of:
 digit selection means constituting said input means and adapted to select particular digits from the received pattern for comparison and to omit at least one digit in every n (where n is an integer greater than two) for use as the said particular digit.

7. A circuit as set forth in claim 6, wherein said digit selection means comprises:
 digit distributing means arranged to receive said serial pattern, and
 a plurality of shift registers connected to the output of said digit distributing means, said digit distributing means connected to said shift registers being adapted to divide the digits of the received pattern between the registers.

8. A circuit as set forth in claim 6, wherein said digit-combining means comprises at least one modulo-2 adder.

9. A circuit as set forth in claim 6, wherein said digit selection means comprises:
 digit distributing means arranged to receive said serial pattern, and
 a plurality of shift registers connected to the output of said digit distributing means, said digit distributing means connected to said shift registers being adapted to divide the digits of the received pattern between the registers,
 at least one modulo-2 adder constituting said digit-combining means, and
 connection means connecting said digit selection means to said at least one modulo-2 adder wherein said connecting means connects said at least one modulo-2 adder to any particular shift register of the plurality by a single connection only.

* * * * *